United States Patent
Orion

(10) Patent No.: US 9,172,432 B2
(45) Date of Patent: Oct. 27, 2015

(54) DEVICE AND SYSTEM FOR COMMUNICATING ON A SUPPLY LINE

(75) Inventor: Jacques Orion, Vienne (FR)

(73) Assignee: Alstom Transport Technologies, Levallois-Perret (FR)

( * ) Notice: Subject to any disclaimer, the term of this patent is extended or adjusted under 35 U.S.C. 154(b) by 959 days.

(21) Appl. No.: 13/262,527

(22) PCT Filed: Mar. 31, 2010

(86) PCT No.: PCT/FR2010/050607
§ 371 (c)(1),
(2), (4) Date: Feb. 1, 2012

(87) PCT Pub. No.: WO2010/112769
PCT Pub. Date: Oct. 7, 2010

(65) Prior Publication Data
US 2012/0119568 A1  May 17, 2012

(30) Foreign Application Priority Data

Mar. 31, 2009 (FR) .................................. 09 52025

(51) Int. Cl.
*H04B 3/54* (2006.01)
(52) U.S. Cl.
CPC ........ *H04B 3/548* (2013.01); *H04B 2203/5458* (2013.01)

(58) Field of Classification Search
None
See application file for complete search history.

(56) References Cited

U.S. PATENT DOCUMENTS

| 4,669,038 | A | * | 5/1987 | Whitford | .................. 363/25 |
| 5,880,635 | A | * | 3/1999 | Satoh | .................. 330/144 |
| 2005/0094735 | A1 | | 5/2005 | Crawford | |

FOREIGN PATENT DOCUMENTS

GB          2154834 A         9/1985

OTHER PUBLICATIONS

International search report for international application No. PCT/FR2010/050607 dated Jun. 6, 2010.

* cited by examiner

*Primary Examiner* — Rexford Barnie
*Assistant Examiner* — Terrence Willoughby
(74) *Attorney, Agent, or Firm* — Patterson & Sheridan, L.L.P.

(57) ABSTRACT

This system for coupling between a wire communication link exhibits a characteristic line impedance suitable for transporting a single signal simultaneously comprising an electrical power supply and data, and a control unit comprising an electrical power supply terminal and a data terminal, said system exhibiting an input impedance. This system comprises means for adapting the input impedance so as to match the characteristic line impedance.

16 Claims, 7 Drawing Sheets

DEVICE AND SYSTEM FOR COMMUNICATING ON A SUPPLY LINE

Figure 1:
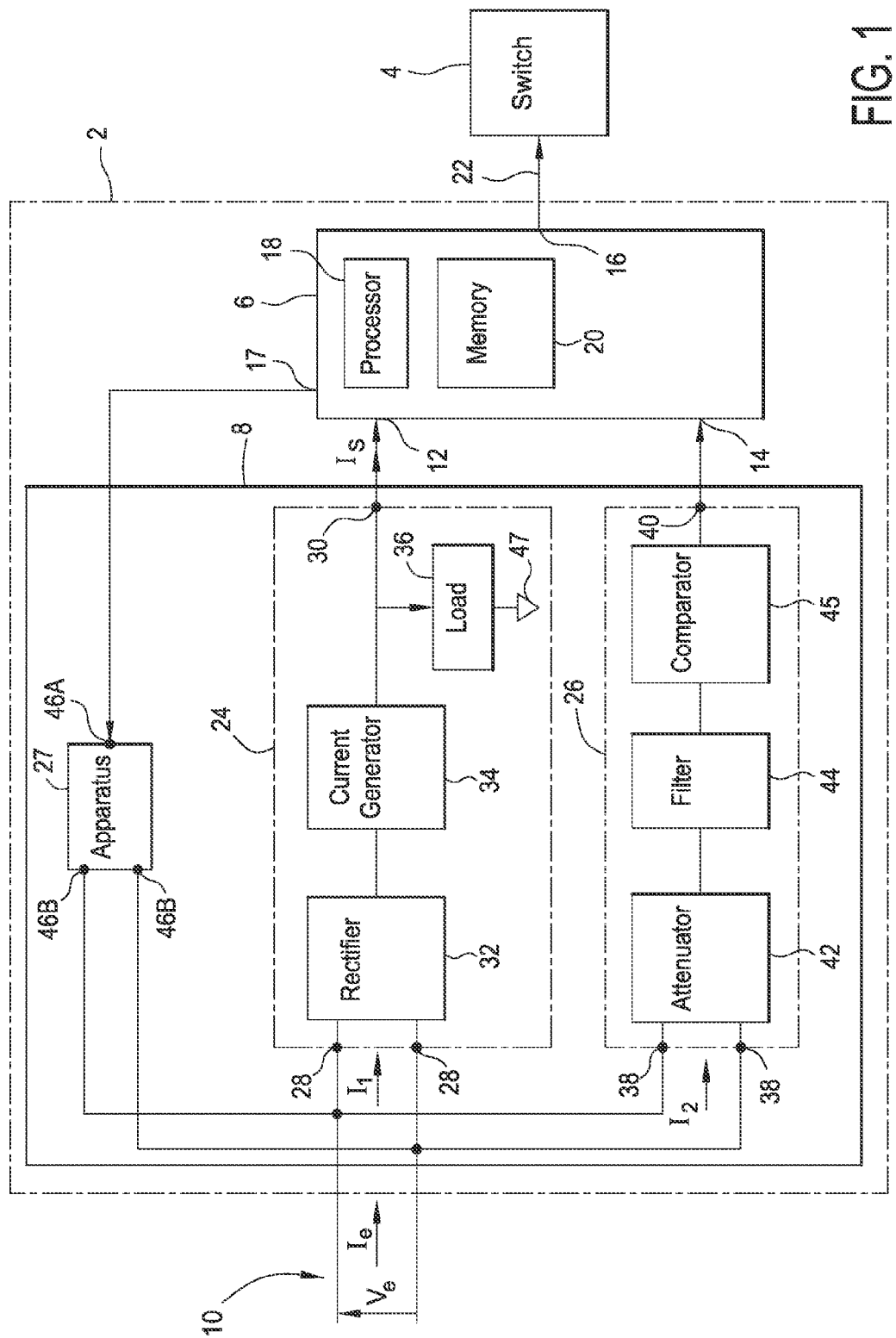

The present invention relates to a coupling system between a wired communications link having a characteristic line impedance and capable of conveying a signal simultaneously comprising electric power supply and data, and a control unit including an electric power supply terminal and a data terminal, said system having an input impedance.

The invention also relates to a device for controlling at least one electronic switch, comprising a unit for controlling said or each electronic switch, said unit including an electric power supply terminal and a data terminal, and a coupling system between a wired communications link capable of conveying a signal simultaneously comprising power supply and data, and said control unit.

A coupling system of the aforementioned type is known. Such a system is used for recovering the electric power supply and the data from a single signal conveyed over a wire link, in order to deliver the electric power supply to the power supply terminal of the control unit on the one hand, and the data to the data terminal of the control unit on the other hand.

However, certain data transmitted by the coupling system to the control unit are corrupt, and therefore cannot be exploited by the latter. Distinguishing between the electric power supply and the data actually proves to be delicate to achieve for the coupling system.

An object of the invention is therefore to improve the transmission of data to the control unit, by reducing the rate of corrupt data by the coupling system.

For this purpose, the object of the invention is a coupling system of the aforementioned type, characterized in that it includes means for adapting the input impedance to the characteristic line impedance.

The inventor noticed that corruption of data by the coupling system is related to the mismatch between the input impedance of the system and the characteristic line impedance caused by the recovery of the electric power supply.

According to other embodiments, the coupling system comprises one or more of the following features, taken individually or according to all the technically possible combinations:

- matching means are capable of matching the input impedance to the characteristic line impedance for a predetermined range of frequencies, called a matching band, and the spectrum of the signal is comprised in said matching band;
- the matching means include a load with a variable value depending on the output current consumed by the control unit at the output of said system;
- the system has an input voltage of constant value, and said load is capable of ensuring that a constant input current is consumed by the system;
- the system has an input voltage of variable value, and said load is capable of ensuring that a variable input current is consumed by the system and substantially equal to the value of the input voltage divided by the value of the characteristic line impedance;
- the system comprises an energy recovery device intended to be connected between the wired link and the power supply terminal, and including said variable load, and a data transmission device intended to be connected between the wired link and the data terminal, and including an attenuator capable of strongly decreasing a second current, consumed at the input of said transmission device;
- said variable load comprises a current reservoir laid out at the output of a current generator;
- the current reservoir includes a Zener diode;
- the attenuator of said transmission device is an attenuator of at least 30 dB, so that the intensity of the second current is less than or equal to $\frac{1}{20}^{th}$ of the intensity of the first current;
- the data transmission device includes a low-pass filter;
- the current generator has a yield greater than or equal to 80%;
- the system has a yield greater than or equal to 60%;
- the system is capable of receiving the signal simultaneously comprising the electric power supply and the data, the electric power supply and the data having a same frequency spectrum;
- the matching band is equal to the spectrum of the signal received at the input of the coupling system;
- the matching band is the range of frequencies substantially comprised between 0 and 20 MHz, preferably comprised between 0 and 15 MHz;
- the data transmission device is capable of only transmitting the data contained in a predetermined frequency interval, called a transmission band;
- the transmission band is comprised in the matching band;
- the transmission band is the frequency interval substantially comprised between 0 and 5 MHz, preferably comprised between 0 and 3 MHz.

The object of the invention is also a device for controlling at least one electronic switch of the aforementioned type, characterized in that the coupling system is as defined above.

Figure 2:
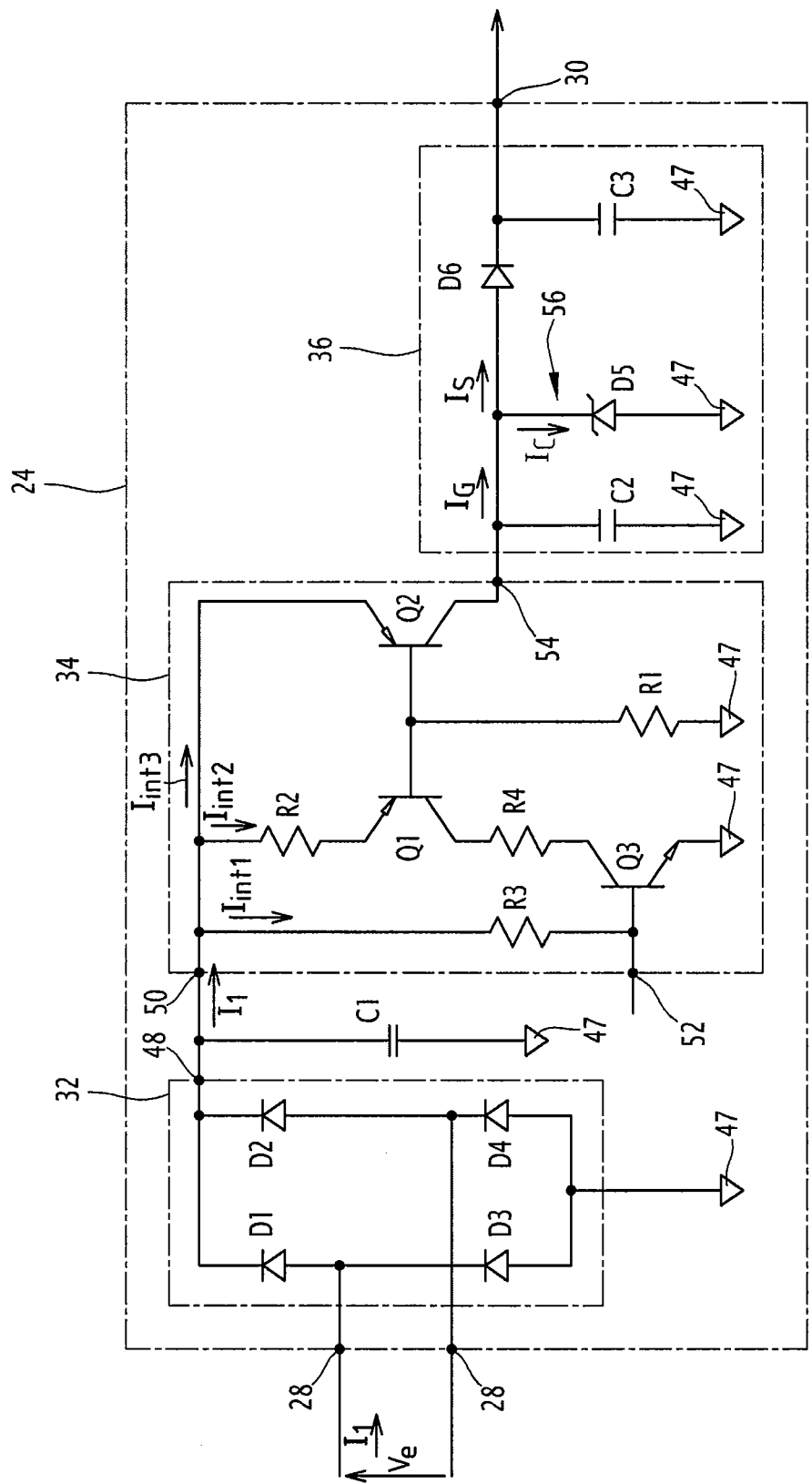
Figure 3:
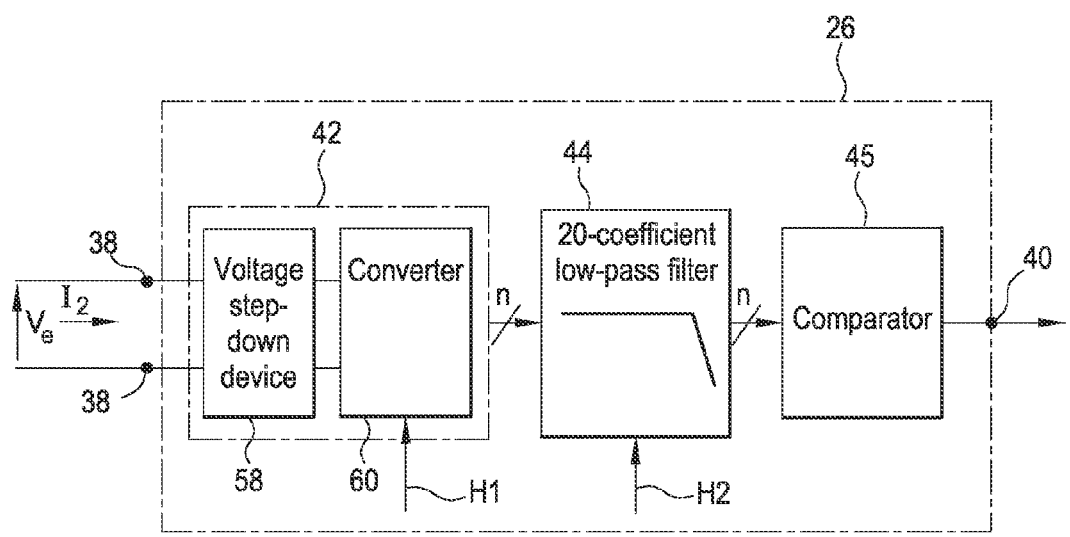
Figure 4:
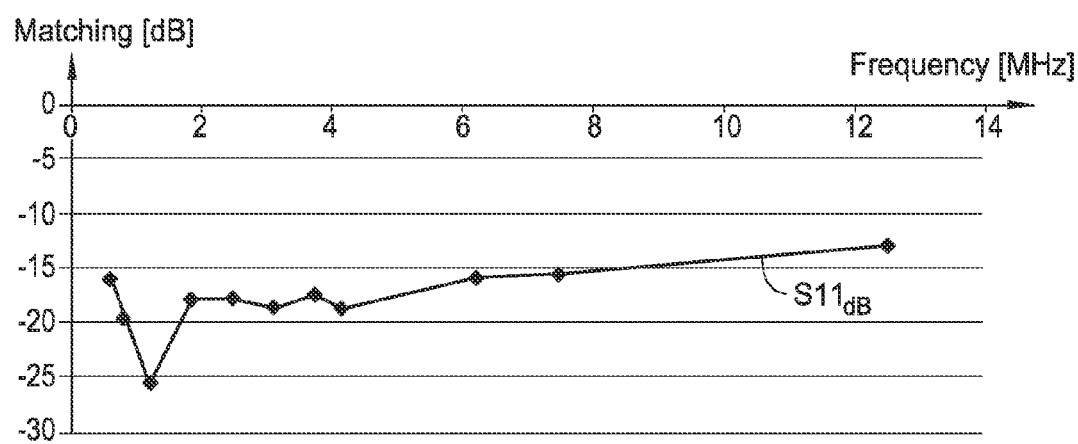
Figure 5:
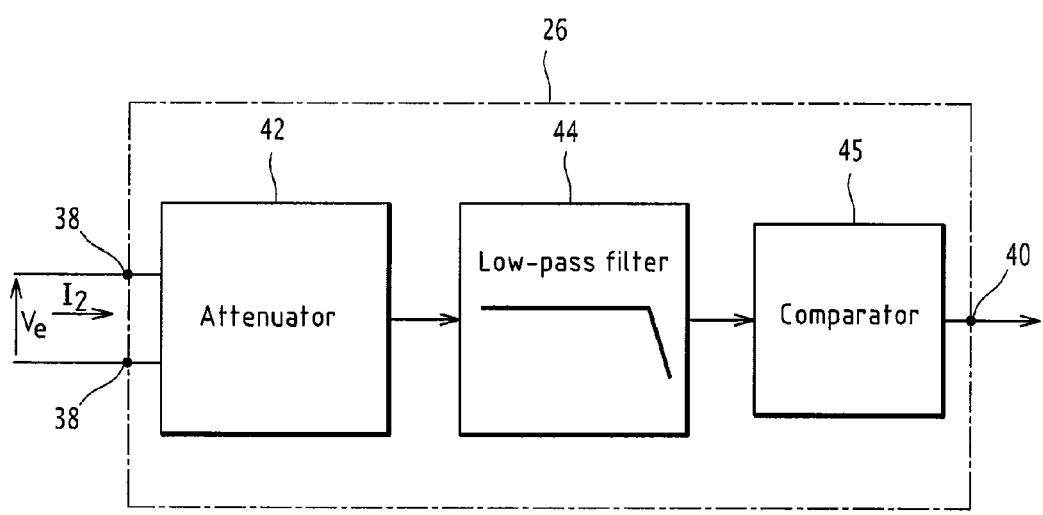
Figure 6:
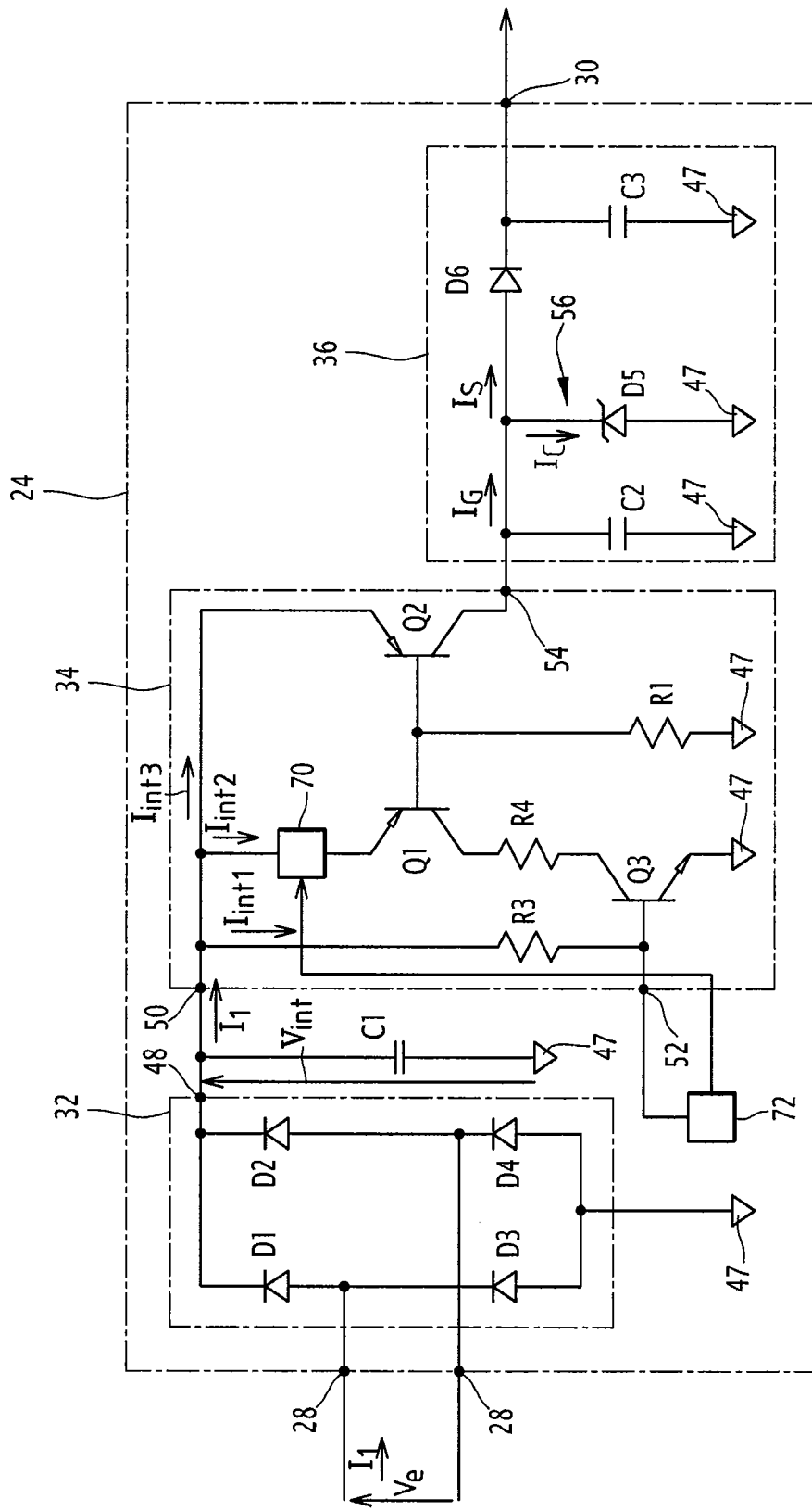
Figure 7:
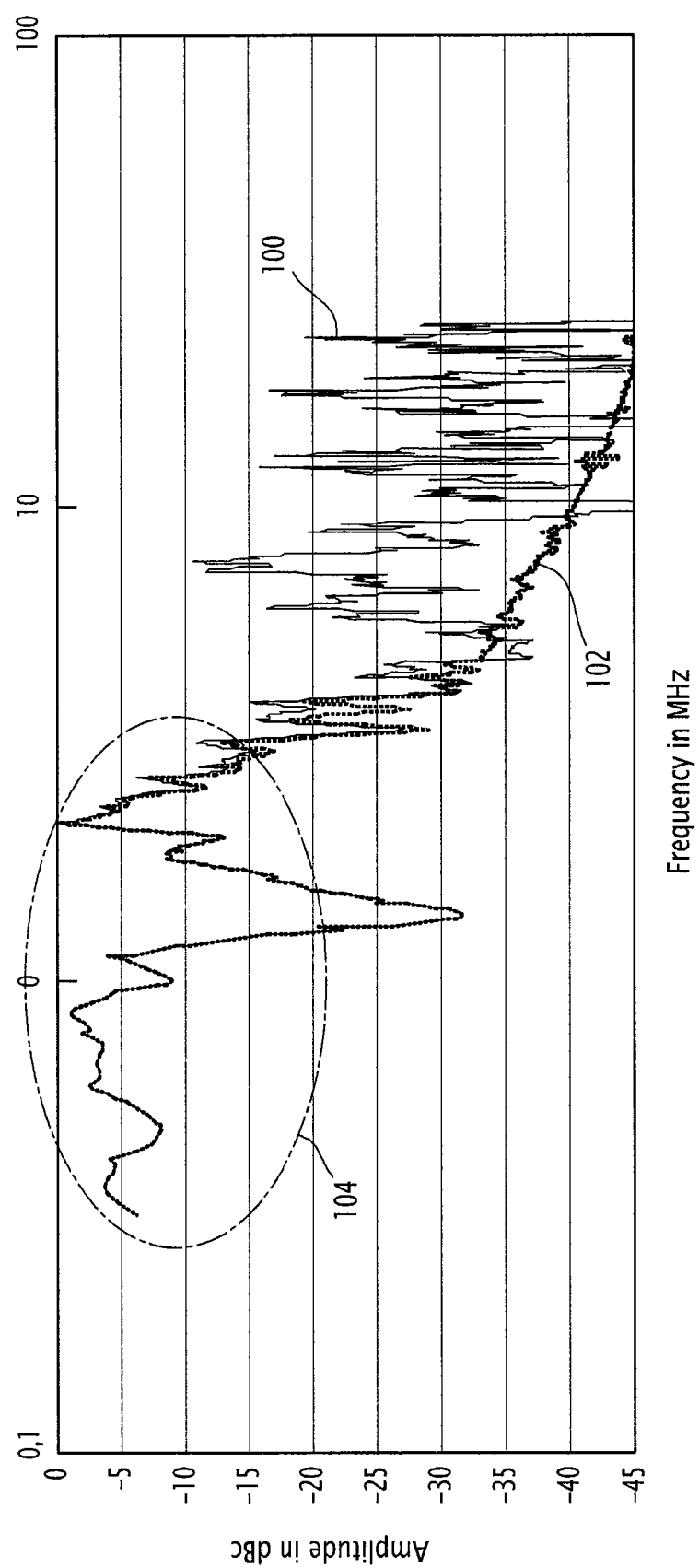
Figure 8:
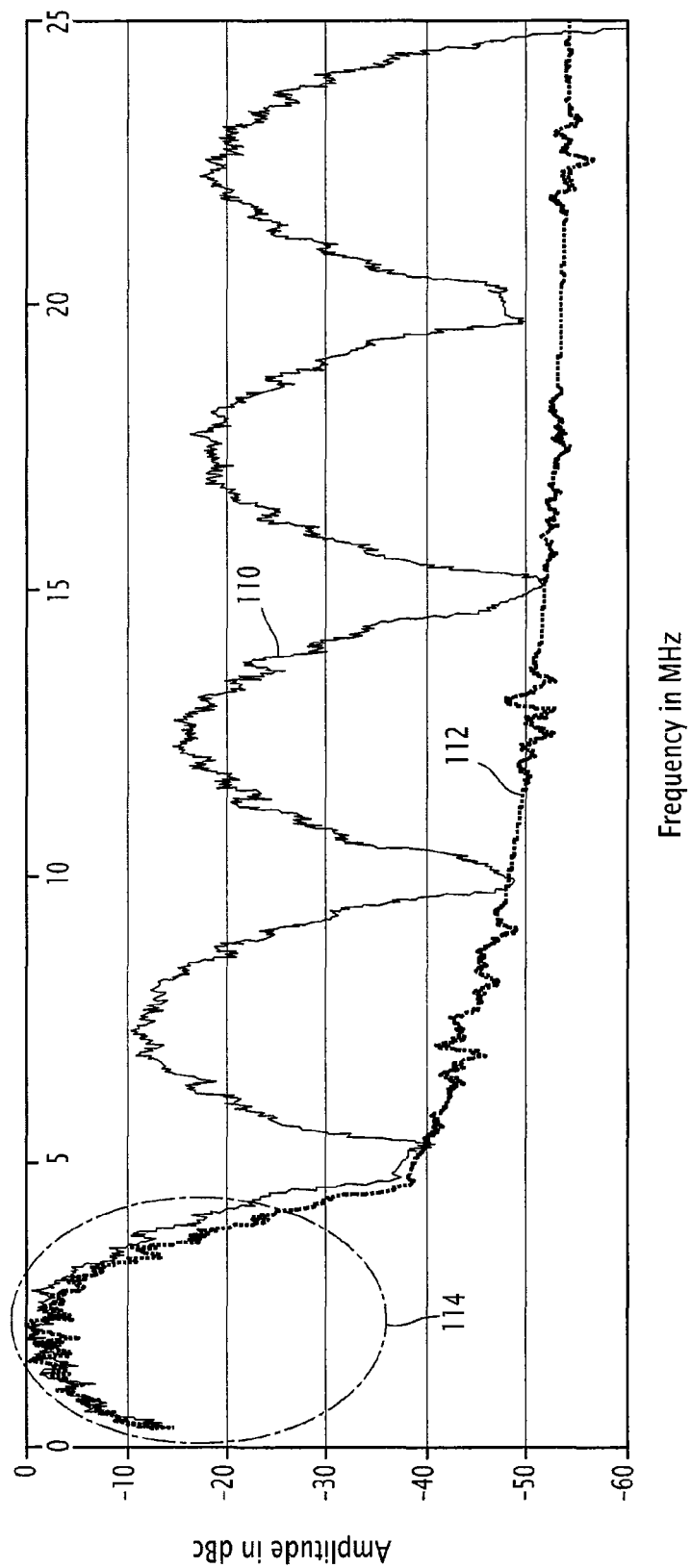

These characteristics and advantages of the invention will become apparent upon reading the description which follows, only given as an example and made with reference to the appended drawings, wherein:

FIG. 1 is a schematic illustration of a device for controlling an electronic switch according to the invention, FIG. 2 is an electric diagram of an energy recovery device of a coupling system of the control device of FIG. 1, FIG. 3 is a schematic illustration of a data transmission device of the coupling system, according to a first embodiment of the invention, FIG. 4 is a curve illustrating the change versus frequency of a parameter representative of the input impedance matching of the coupling system of the device of FIG. 1, FIG. 5 is an analogous view to that of FIG. 3, according to a second embodiment of the invention, FIG. 6 is an analogous view to that of FIG. 2, according to a third embodiment of the invention, FIG. 7 is a set of curves illustrating the respective standardized frequency spectra of a first information signal received at the input of the coupling system and of the corresponding signal at the output of a filter of the data transmission device, and FIG. 8 is a set of curves analogous to that of FIG. 7 for a second information signal received at the input of the coupling system.

In FIG. 1, a device 2 for controlling an electronic switch 4 comprises a unit 6 for controlling the switch and a coupling system 8 between a wired communications link 10 and the control unit 6.

The electronic switch 4 is for example a switch of a voltage inverter with a specific voltage for powering an electronic motor of a transport, notably railway, vehicle, the voltage inverter delivering a three-phase AC output voltage from a DC input voltage. The electronic switch 4 is for example an Insulated Gate Bipolar Transistor, also called an IGBT transistor, or further a thyristor.

The control unit 6 includes two input terminals, i.e. an electronic power supply terminal 12 and a data terminal 14, and two output terminals 16, 17. The input terminals 12, 14 are connected to the coupling system 8, a first output terminal 16 is connected to the switch 4, and the second output terminal 17 is connected to the coupling system 8.

The control unit 6 includes an information processing unit for example formed by a data processor 18, associated with a memory 20. The memory 20 is capable of storing software for calculating a signal 22 for controlling the switch 4 depending on a selected pulse width modulation. The memory 20 is also capable of storing software for applying the signal 22 to control the switch 4.

The coupling system 8 comprises an energy recovery device 24 and a data transmission device 26, forming an apparatus for receiving an information signal from the wired communications link 10. The coupling system 8 is capable of recovering the electric power supply and the data from a single signal conveyed over the wire link 10. The coupling system 8 comprises an apparatus 27 for transmitting another information signal over the wired communications link 10. The coupling system 8 has an input impedance $Z_e$ equal to $V_e/I_e$, where $V_e$, $I_e$ are the voltage and the intensity of an input current of the coupling system 8, respectively.

The wired communications link 10 is capable of conveying information signals, each information signal simultaneously comprising power supply and data. The wire link 10 has a characteristic line impedance $Z_0$. The wire link 10 is for example an RS485 serial link, a RS482 serial link or further an Ethernet link.

The energy recovery device 24 is connected at the input to the wired communications link 10 via two input terminals 28, and at the output to the electric power supply terminal 12 of the control unit via an output terminal 30. The energy recovery device 24 comprises a rectifier 32, a current generator 34 and a variable load 36.

The data transmission device 26 includes two input terminals 38 connected to the wired communications link 10, and an output terminal 40 connected to the data terminal 14. The data transmission device 26 comprises an attenuator 42, a filter 44 and a comparator 45, laid out in series and in this order.

The transmission apparatus 27 includes an input terminal 46A connected to the second output terminal 17 of the control unit, and two output terminals 46B connected to the wired communications link 10.

The rectifier 32 is connected at the input to the input terminals 28 and at the output to the current generator 34. The rectifier 32 is capable of converting an input AC current into an output DC current.

The current generator 34 is connected at the output to the output terminal 30.

The variable load 36 is connected between the output terminal 30 and electric ground 47, as a bypass with respect to the rectifier 32 and to the current generator 34 laid out in series. The load 36 has a variable value depending on an output current $I_S$ consumed by the control unit 6 at the output of the system 8. The variable load 36 is capable of ensuring the consumption of a first constant current $I_1$ at the input of the energy device of the current 24.

The rectifier 32 is connected at the input to both input terminals 28 of the energy recovery device, and includes an output terminal 48, as illustrated in FIG. 2. The rectifier 32 is for example made in the form of a bridge of diodes D1, D2, D3 and D4. The diodes D1-D4 are for example Schottky diodes with a very low capacitance, of the order of one pF, in order to minimize energy loss. The input voltage of the bridge of diodes D1-D4 is the voltage $V_e$, and the output voltage of the bridge is measured between a junction point between the diodes D1 and D2 on the one hand, and a junction point between the diodes D3 and D4 connected to the electric ground 47 on the other hand. The junction point between the diodes D1 and D2 is connected to the output terminal 48.

A filtering capacitor C1 is positioned between the rectifier 32 and the current generator 34. The filtering capacitor C1 is connected between the output terminal 48 and the electric ground 47. Its value is selected so as to stabilize the current generator, while making sure that the spectrum of the received information signal is comprised in the band pass of the energy recovery device 24.

The current generator 34 includes an input terminal 50, a control terminal 52 and an output terminal 54. The current generator 34 for example comprises first and second bipolar transistors Q1, Q2, identical and connected together through their base. The junction point between both bases is connected to the electric ground 47 via a first resistor R1. The emitter of the first bipolar transistor Q1 is connected to the input terminal 50 via a second resistor R2. The emitter of the second bipolar transistor Q2 is directly connected to the input terminal 50, and the collector of the second bipolar transistor O2 is directly connected to the output terminal 54 of the current generator. The bipolar transistors Q1, Q2 are PNP transistors. The bipolar transistors Q1, Q2 are for example transistors with very low capacitance, of the order of one pF.

The current generator 34 includes a third bipolar transistor Q3 for controlling the first transistor Q1. The third transistor Q3 is an NPN transistor. The base of the third transistor Q3 is connected to the control terminal 52 on the one hand and to the input terminal 50 on the other hand via a third resistor R3. The collector of the third transistor Q3 is connected to the collector of the first transistor Q1 via a fourth resistor R4, and the emitter of the third transistor Q3 is connected to the electric ground 47.

The variable load 36, laid out at the output of the current generator 34, comprises a current reservoir 56, two stabilization capacitors C2, C3 and a protective diode D6. The current reservoir 56 includes a Zener diode D5. A first stabilization capacitor C2 is connected upstream from the Zener diode D5, between the output terminal 54 of the current generator and the electric ground 47. The Zener diode D5 is connected between the output terminal 54 of the current generator and the electric ground 47. The protective diode D6 is laid out between the output terminal 30 of the energy recovery device and the output terminal 54 of the current generator. The second stabilization capacitor C3 is connected downstream from the protective diode D6, between the output terminal 30 of the energy recovery device and the electric ground 47.

The attenuator 42 is capable of strongly decreasing a second current $I_2$ consumed at the input of the data transmission device 26. The attenuator 42 is an attenuator of at least 30 decibels, so that the intensity of the second current $I_2$ is less than or equal to $1/20^{th}$ of the intensity of the first current $I_1$. The load 36 is than capable of ensuring a constant value of the intensity of the input current $I_e$ consumed by the system 8, the intensity of the input current $I_e$ being equal to the sum of the intensities of the first current and of the second current $I_2$, and therefore substantially equal to the intensity of the first current $I_1$.

In the exemplary embodiment of FIG. 3, the data transmission device 26 is made with digital components.

The attenuator 42 includes a voltage step-down device 58 and an analog/digital converter 60, positioned at the output of the voltage step-down device 58. The input voltage of the voltage step-down device 58 is equal to the voltage $V_e$, and the output voltage of the voltage step down device 58 is substantially equal to $1/25^{th}$ of said input voltage $V_e$, no that the amplitude of the signal at the output of the voltage step-down device 58 is compatible with the dynamic range of the analog/digital converter 60. The analog/digital converter 60 is clocked by a first clock H1, for example with a frequency equal to 25 MHz.

The filter 44 is a low-pass filter. The low-pass filter 44 is for example a filter with 20 coefficients having a 1 dB cutoff frequency equal to 2.5 MHz. The attenuation of the low-pass filter 44 is greater than 30 decibels for a frequency above 6 MHz. The filter 44 is clocked by a second clock H2 with a frequency equal to 25 MHz.

Alternatively, the low-pass filter 44 has a 1 dB cutoff frequency equal to 3 MHz or further to 5 MHz.

The comparator 45 is a digital comparator.

The operation of the coupling system 8 according to the invention will now be described.

When the coupling system 8 operates with reception of information signals, the transmission apparatus 27 is not to high impedance, in order to consume at the input a current with substantially zero intensity.

The current $I_e$ at the input of the coupling system is then divided between the first current consumed by the energy recovery system 24 and the second current $I_2$ consumed by the data transmission device 26, the current consumed by the transmission apparatus 27 being substantially zero. The intensity of the second current $I_2$ is clearly less than that of the first current $I_1$, preferably less than or equal to $1/20^{th}$ of the intensity of the first current $I_1$, because of the attenuator 42. The intensity of the first current $I_1$ is therefore substantially equal to the intensity of the input current $I_e$.

The rectifier 32 does not modify the intensity of the current crossing it so that the intensity of the current circulating through its output terminal 48 is equal to the intensity of the first current $I_1$ circulating through its input terminals 28.

The intensity of the current circulating through the input terminal 50 of the current generator is substantially equal to that of the current circulating through the output terminal 48 of the rectifier, the intensity of the current circulating in the capacitor C1 being negligible.

A control signal delivered to the control terminal 52 is sent so that the current generator 34 operates as a current "mirror", the transistors, Q1, Q2 being identical. The transistors Q1, Q2 are used in a dissymmetrical way because of the second resistor R2, in order to increase the yield of the current generator 34. The first current $I_1$ is then divided into three intermediate currents $I_{int1}$, $I_{int2}$, $I_{int3}$. The first $I_{int1}$, second $I_{int2}$ and third $I_{int3}$ intermediate currents circulate through the third resistor R3, the second resistor R2 and the emitter of the second bipolar transistor Q2, respectively. The intensity of a generator current $I_G$ circulating through the output terminal 54 of the current generator is equal to that of the third intermediate current $I_{int3}$ which is proportional to that of the first current circulating through the input terminal 50 of the current generator, because of the current mirror operation of the current generator.

The generator current $I_G$ delivered by the current generator is divided into two currents, i.e. the output current $I_S$ circulating through the output terminal 30 of the energy recovery device and consumed by the control unit 6, and a load current $I_C$ circulating through the Zener diode D5 of the variable load 36. The Zener diode 5 is dimensioned according to the voltage used by the control unit 6. Because of the Zener diode D5, the load 36 has a variable value depending on the output current $I_S$, so that the generator current $I_G$, equal to the sum of the output current $I_S$ and of the load current $I_C$, has an intensity of constant value. The intensity of the generator current $I_G$ is proportional to that of the first current $I_1$ circulating at the input of the energy recovery device 24, and the intensity of the first current $I_1$ then has a constant value.

The stabilization capacitors C2, C3 give the possibility of damping the oscillations of the output current $I_S$, and thereby stabilize it. In other words, the stabilization capacitors C2, C3 filter out the high frequencies of the output current $I_S$.

The energy recovery device 24 thus consumes a current of constant intensity at these input terminals 28, while delivering an output current $I_S$ of variable intensity depending on the energy consumed by the control unit 6. The intensity of the second current $I_2$ further being negligible relatively to that of the first current $I_1$, the intensity of the input current $I_e$ of the coupling system is therefore substantially constant, so that the input impedance $Z_e$ is also constant.

The values of the resistors R2, R3 and R4 of the current generator are further dimensioned so that the first current has a value substantially equal to the input voltage $V_e$ divided by the value of the characteristic line impedance $Z_0$ of the wire link 10.

The input impedance $Z_e$ of the coupling system is substantially equal to the voltage $V_e$ divided by the intensity of the first current $I_1$, because of the attenuation of the second current $I_2$. In other words, the input impedance $Z_e$ is equal to the characteristic line impedance $Z_0$ of the wire link 10.

The current generator 34, the variable load 36 and the attenuator 42 thus match the input impedance $Z_e$ to the characteristic line impedance $Z_0$ of the wire link 10. This matching is carried out for a predetermined range of frequencies, called a matching band. The matching band is notably a function of the value of the filtering capacitor C1. The value of the filtering capacitor C1 is selected so that the spectrum of the signal is comprised in said matching band. The matching band is also a function of the values of capacitances of the diodes D1-D4 and of the bipolar transistors Q1 and Q2. The diodes D1-D4 and the bipolar transistors Q1 and Q2 having capacitances of very low value, of the order of one pF, do not have any influence on the matching band.

The matching of the input impedance $Z_e$ to the characteristic line impedance $Z_0$ is achieved by the coupling system 8 within a delay of less than 300 ns. This matching delay is mainly due to the bridge of diodes of the rectifier 32, to the bipolar transistors Q1, Q2, Q3 of the current generator 34, and to the charge of the capacitors C1, C2, C3. This matching delay is clearly less than the half period of the received signals, and thus does not perturb the reception of said signals.

The electric energy is available at the output of the energy recovery device 24 after an unavailability delay of less than 8 µs. This unavailability delay is mainly due to the stabilization capacitors C2, C3. This delay is very short, and thus allows rated operation of the control unit 6.

FIG. 4 illustrates the change in the quantity $S11_{dB}$ versus frequency, the quantity $S11_{dB}$ being written as $$S11_{dB} = 20 \times \log|S11| \qquad (1)$$

wherein S11 is the S parameter representing the reflection coefficient at the input when the output is matched, and is written as:

$$S11 = \frac{Ve - Zo \cdot Ie}{Ve + Zo \cdot Ie} = \frac{Ze - Zo}{Ze + Zo} \qquad (2)$$

It is thus seen that the quantity $S11_{dB}$, equal to the modulus in decibels of the parameter S11 has a value of less than or equal to −15 dB up to about 8 MHz. This curve is obtained for a signal, for which the fundamental frequency to 2.5 MHz. It is thus noted that impedance matching, measured by the quantity $S11_{dB}$, is better than −15 dB up to the harmonic 3 of the eigenfrequencies of the signal.

The value of the second resistor R2 is selected so that the current generator 34 has a yield greater than or equal to 80%. The system 8 has a yield greater than or equal to 60% because of the yield greater than or equal to 80% of the current generator 34.

When the coupling system 8 operates by transmitting information signals, a control signal is delivered to the control terminal 52 in order to inhibit the energy recovery device 24. The intensity of the first current $I_1$ is then substantially zero, and does not perturb the information signal transmitted by the transmission apparatus 27 through its output terminals 46B towards the wire link 10.

FIG. 5 illustrates a second embodiment of the invention, for which the elements analogous to the first embodiment described earlier are marked with identical references.

According to the second embodiment, the data transmission device 26 is made with analog components.

The attenuator 42 is a 30 dB analog attenuator, and has an output impedance corresponding to the input impedance filter 44, for example 120 Ω.

The filter 44 is a low-pass filter of order 5 having a cutoff frequency at 1 decibel equal to 25 MHz. The attenuation of the low-pass filter 44 is greater than or equal to 30 dB for a frequency above 6.8 MHz. The cutoff frequency and the attenuation of the filter 44 are calculated so as to only retain the useful spectrum of the data. The bandwidth of the filter 44 is thus comprised in the matching band, and the narrower the bandwidth of the filter 44, the higher is the signal-to-noise ratio of the filtered data.

Alternatively, the low-pass filter 44 has a 1 dB cutoff frequency equal to 3 Hz or further to 5 MHz.

The comparator 45 is a conventional analog comparator.

The operation of this second embodiment is identical with that of the first embodiment and is therefore not described again.

The advantages of this second embodiment are identical with those of the first embodiment and are therefore not described again.

FIG. 6 illustrates a third embodiment of the invention, for which the elements analogous to the embodiments described earlier are marked with identical references.

According to third embodiment, the second resistor is replaced with a MOSFET transistor 70, and the control terminal 52 is connected to a member 72 for controlling the MOSFET transistor 70 and the third bipolar transistor Q3. The control member 72 includes means for measuring the intermediate voltage $V_{int1}$ at the terminals of the first capacitor C1.

The operation of this third embodiment will now be described.

When the coupling system 8 has an input voltage $V_e$ with a variable value, the control member 72 measures the variations of this input voltage $V_e$ via the means for measuring the voltage $V_{int}$, the intermediate voltage $V_{int}$ being substantially equal to the input voltage $V_e$. The control member 72 then drives the current generator 34 in order to obtain by means of the variable load, a variable input current $I_e$ substantially equal to the value of the input voltage $V_e$ divided by the value of the characteristic line impedance $Z_0$.

The unavailability delay of the electric energy further being very short, the coupling system 8 thus allows a rated operation of the control unit 6, when the input voltage $V_e$ is of a variable value.

The other advantages of this third embodiment are identical with those of the previous embodiments and are therefore not described again.

Alternatively, the transistors Q1, Q2, Q3 are MOS transistors.

It is thus conceivable that with the invention, it is possible to propose a coupling system having an impedance matched to the characteristic line impedance of the wired communications link to which it is connected. With the invention, it is thereby possible to improve transmission of the data to the control unit, by reducing the rate of corrupt data by the coupling system.

The electric power supply and the data, stemming from a single signal conveyed over the wire link 10, have identical frequency spectra, coinciding with the frequency spectrum of the single signal received at the input of the coupling system 8 via the wire link 10.

The matching band is for example the range of frequencies including the fundamental and the first two harmonics following the fundamental, also called harmonic No. 3 and harmonic No. 5, of the information signal. The spectrum of the information signal is then partly comprised in said matching band.

The matching band also corresponds to the range of frequencies for which the energy recovery device 24 recovers the energy of the electric power supply contained in the information signal received at the input of the coupling system 8.

The matching band is for example the range of frequencies substantially comprised between 0 and 20 MHz, preferably comprised between 0 and 15 MHz.

Alternatively, the matching band is equal to the whole of the spectrum of the information signal, and the spectrum of the signal is then totally comprised in said matching band.

The data transmission device 26 is for example capable of transmitting to the control unit 6 only the data contained in a predetermined frequency interval, called a transmission band.

The transmission band is comprised in the matching band, in other words, the spectrum used for transmitting the data contained in the information signal is comprised in the spectrum used for recovering the electric power supply energy, also contained in the information signal.

The transmission band is for example the frequency interval only including the fundamental of the information signal. In other words, the cutoff frequency of the low-pass filter 44 is then equal to the upper frequency of the fundamental of the information signal, so as to only retain the fundamental of the information signal and not to transmit the data contained in the harmonics of the information signal.

The transmission of the sole data contained in the fundamental of the information signal allows improvement in the signal-to-noise ratio of the data. Indeed, the comparator 45 is capable of determining the data contained in the information signal only from its fundamental, the noise contained in the harmonics of the information signal being suppressed during the filtering carried out by the low-pass filter 44. The data are then transmitted by the comparator 45 to the control unit 6.

The transmission band is for example the frequency interval comprised between 0 and 5 MHz, preferably comprised between 0 and 3 MHz.

In FIG. 7, curve 100 represents the standardized frequency spectrum of a first information signal received at the input of the coupling system 8, the data of which for example include a plurality of packets and dead times, each dead time separating two successive packets. The packets for example use Manchester type coding, and the dead times have a duration for example comprised between 200 and 800 nanoseconds. Curve 102 represents the standardized frequency spectrum of the signal at the output of the filter 44 and corresponding to the first information signal.

In the exemplary embodiment of FIG. 7, the first information signal has a frequency spectrum, the fundamental of which substantially corresponds to the frequencies comprised between 0 and 3 MHz as illustrated by the encircled area 104. The first harmonic following the fundamental (harmonic No. 3) substantially corresponds to the frequencies comprised between 1.5 and 8 MHz, and the second harmonic following the fundamental (harmonic No. 5) substantially corresponds to the frequencies comprised between 3 and 15 MHz.

In the exemplary embodiment of FIG. 7, the matching band is the range of frequencies comprised between 0 and 15 MHz, and the transmission band is the frequency interval comprised between 0 and 3 MHz. The cutoff frequency of the low-pass filter 44, for example equal to 3 MHz, then corresponds to the upper frequency of the transmission band.

FIG. 8 illustrates another embodiment of the invention for which the signal received at the input of the coupling system 8 is a second information signal.

The curve 110 illustrates the standardized frequency spectrum of the second information signal received at the input of the coupling system 8, the data of which include a plurality of successive packets. The packets for example use conventional coding of the Manchester type. The curve 112 illustrates the standardized frequency spectrum of the signal at the output of the filter 44 and corresponding to the second information signal.

In the exemplary embodiment of FIG. 8, the second information signal has a frequency spectrum, the fundamental of which substantially corresponds to the frequencies comprised between 0 and 5 MHz as illustrated by the encircled area 114. The first harmonic following the fundamental (harmonic No. 3) substantially corresponds to the frequencies comprised between 5 and 10 MHz, and the second harmonic following the fundamental (harmonic No. 5) substantially corresponds to the frequencies comprised between 10 and 15 MHz.

In the exemplary embodiment of FIG. 8, the matching band is the range of frequencies comprised between 0 and 15 MHz, and the transmission band is the interval of frequencies comprised between 0 and 5 MHz. The cutoff frequency of the low-pass filter 44 is for example, equal to 5 MHz, than corresponds to the upper frequency of the transmission band.

It is thus conceivable that the invention gives the possibility of proposing a coupling system having an input impedance matched to the characteristic line impedance for a predetermined range of frequencies, called an matching band, while transmitting the data only contained in a narrower range of frequencies, called a transmission band, the transmission band being further contained in the matching band.

The invention claimed is:

1. A coupling system between a control unit and a wired communications link, the wired communications link having a characteristic line impedance and being capable of conveying a signal simultaneously comprising an electric power supply and data, the control unit including an electric power supply terminal and a data terminal, said coupling system having an input impedance,
   wherein the coupling system includes means for matching the input impedance to the characteristic line impedance,
   wherein the means for matching include a load with a variable value depending on an output current consumed by the control unit at the output of said coupling system, and wherein the coupling system has an input voltage of variable value,
   wherein said load is capable of ensuring that a variable input current is consumed by the coupling system and substantially equal to the value of the input voltage divided by the value of the characteristic line impedance, and
   wherein the coupling system is capable of receiving the signal simultaneously comprising the electric power supply and the data, the electric power supply and the data having a same frequency spectrum.

2. The coupling system according to claim 1, wherein the matching means are capable of matching the input impedance to the characteristic line impedance for a predetermined range of frequencies, called matching band, and in that the spectrum of the signal is at least partly comprised in said matching band.

3. The coupling system according to claim 2, wherein the matching band is equal to the spectrum of the signal received at the input of the coupling system.

4. The coupling system according to claim 2, wherein the matching band is the range of frequencies substantially comprised between 0 and 20 MHz, preferably comprised between 0 and 15 MHz.

5. The coupling system according to claim 2,
   wherein the matching means include a load with a variable value depending on an output current consumed by the control unit at the output of said coupling system,
   wherein the coupling system comprises an energy recovery device intended to be connected between the wired communications link and the electric power supply terminal, and including said variable load, and a data transmission device intended to be connected between the wired communications link and the data terminal and including an attenuator capable of strongly reducing a second current, consumed at the input of said transmission device,
   wherein the data transmission device is capable of only transmitting the data contained in a predetermined frequency interval, called a transmission band, and
   wherein the transmission band is comprised in the matching band.

6. The coupling system according to claim 1, wherein the coupling system has an input voltage of constant value, and wherein said load is capable of ensuring that a constant input current is consumed by the coupling system.

7. The coupling system according to claim 1, wherein said load with the variable value comprises a current reservoir laid out at the output of a current generator.

8. A device for controlling at least one electronic switch, comprising a control unit for controlling each electronic switch, said control unit including an electric power supply terminal and a data terminal, and a coupling system between said control unit and wired communications link, the wired communications link being capable of conveying a signal simultaneously comprising an electric power supply and data, wherein the coupling system is in accordance with claim 1.

9. A coupling system between a control unit and a wired communications link, the wired communications link having a characteristic line impedance and being capable of conveying a signal simultaneously comprising an electric power supply and data, the control unit including an electric power supply terminal and a data terminal, said coupling system having an input impedance, wherein the coupling system includes means for matching the input impedance to the characteristic line impedance, wherein the means for matching include a load with a variable value depending on an output current consumed by the control unit at the output of said coupling system, wherein the coupling system is capable of receiving the signal simultaneously comprising the electric power supply and the data, the electric power supply and the data having a same frequency spectrum, and wherein the coupling system comprises an energy recovery device intended to be connected between the wired communications link and the electric power supply terminal, and including the load with the variable value, and a data transmission device intended to be connected between the wired communications link and the data terminal and including an attenuator capable of strongly reducing a second current, consumed at an input of said data transmission device.

10. The coupling system according to claim 9, wherein the data transmission device includes a low-pass filter.

11. The coupling system according to claim 9, wherein the data transmission device is capable of only transmitting the data contained in a predetermined frequency interval, called a transmission band.

12. The coupling system according to claim 11, wherein the transmission band is the interval of frequencies substantially comprised between 0 and 5 MHz, preferably comprised between 0 and 3 MHz.

13. The coupling system according to claim 9, wherein the matching means are capable of matching the input impedance to the characteristic line impedance for a predetermined range of frequencies, called matching band, and in that the spectrum of the signal is at least partly comprised in said matching band.

14. The coupling system according to claim 9, wherein the coupling system has an input voltage of constant value, and wherein said load is capable of ensuring that a constant input current is consumed by the coupling system.

15. The coupling system according to claim 9, wherein said load with the variable value comprises a current reservoir laid out at the output of a current generator.

16. A device for controlling at least one electronic switch, comprising a control unit for controlling each electronic switch, said control unit including an electric power supply terminal and a data terminal, and a coupling system between said control unit and a wired communications link capable of conveying a signal simultaneously comprising an electric power supply and data, wherein the coupling system is in accordance with claim 9.

* * * * *